(12) United States Patent
Meyhofer et al.

(10) Patent No.: US 10,099,723 B2
(45) Date of Patent: *Oct. 16, 2018

(54) INTEGRATED CLUTCH STEERING SYSTEM (71) Applicant: Uber Technologies, Inc., San Francisco, CA (US)

(72) Inventors: Eric Meyhofer, Pittsburgh, PA (US); David Rice, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/239,056

(22) Filed: Aug. 17, 2016

(65) Prior Publication Data
US 2017/0174259 A1  Jun. 22, 2017

Related U.S. Application Data (63) Continuation of application No. 14/979,187, filed on Dec. 22, 2015, now Pat. No. 9,481,393.

(51) Int. Cl.
| | | |
|---|---|---|
| *B62D 6/10* | (2006.01) | |
| *B62D 6/00* | (2006.01) | |
| *B62D 3/02* | (2006.01) | |
| *B62D 3/14* | (2006.01) | |
| *F16D 7/02* | (2006.01) | |
| *B62D 1/28* | (2006.01) | |
| *F16D 48/06* | (2006.01) | |
| *B62D 1/04* | (2006.01) | |
| *B62D 5/04* | (2006.01) | |

(52) U.S. Cl.
CPC ............. *B62D 6/10* (2013.01); *B62D 1/04* (2013.01); *B62D 1/286* (2013.01); *B62D 3/02* (2013.01); *B62D 3/14* (2013.01); *B62D 5/043* (2013.01); *B62D 6/00* (2013.01); *F16D 7/02* (2013.01); *F16D 48/06* (2013.01)

(58) Field of Classification Search
CPC ....................................................... B62D 6/00
See application file for complete search history.

(56) References Cited

U.S. PATENT DOCUMENTS

| | | | |
|---|---|---|---|
| 6,044,921 A | 4/2000 | Lansberry | |
| 7,894,951 B2 * | 2/2011 | Norris | H04L 67/12 180/443 |
| 9,221,490 B2 | 12/2015 | Shibuya | |
| 9,481,393 B1 * | 11/2016 | Meyerhoffer | B62D 6/00 |
| 9,669,864 B2 * | 6/2017 | Perichon | G05G 5/16 |
| 2004/0238258 A1 | 12/2004 | Ono et al. | |
| 2005/0274565 A1 | 12/2005 | Greenwell et al. | |
| 2013/0103264 A1 | 4/2013 | Takashima | |
| 2015/0134205 A1 | 5/2015 | Shibuya | |
| 2016/0009311 A1 * | 1/2016 | Khale | B62D 1/184 74/530 |
| 2016/0375925 A1 * | 12/2016 | Lubischer | B62D 1/183 701/41 |

* cited by examiner

*Primary Examiner* — Jonathan M Dager
*Assistant Examiner* — Michael A Berns
(74) *Attorney, Agent, or Firm* — Mahamedi IP Law LLP (57) ABSTRACT

An integrated clutch steering mechanism for an autonomous vehicle (AV) can include a steering clutch coupled to a steering column of the AV, and an AV steering motor coupled to the steering clutch. The AV steering motor can apply torque to the steering column via the steering clutch to control steering of the AV. When a predetermined amount of torque is exceeded on the steering column, the steering clutch slips to enable manual steering of the AV.

15 Claims, 6 Drawing Sheets

Integrated Clutch Steering System
200

INTEGRATED CLUTCH STEERING SYSTEM

RELATED APPLICATION

This application is a continuation of U.S. patent application Ser. No. 14/979,187, entitled "INTEGRATED CLUTCH STEERING SYSTEM," filed on Dec. 22, 2015; hereby incorporated by reference in its entirety.

BACKGROUND

Automated or autonomous vehicles (AVs) can process environmental data in order to control operation of the on-board systems of the AV, such as the acceleration, braking, and steering systems. In certain situations (e.g., to perform corrective maneuvering), a user may assertively, or via AV request, take over manual control of the AV's on-board systems.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

The current transition to fully automated driving can involve upgrading and retrofitting commercially available road vehicles, or building purpose-based AVs with a focus on commercial use. In either case, the AV can include a number of sensors installed on the vehicle (e.g., stereo cameras, radar equipment, light detecting and ranging (LiDAR) equipment, motion sensors, and the like) and an on-board data processing and control system (i.e., the AV control system) to process the AV sensor data and control the operation of the AV on surface streets and in traffic. The AV control system can control various aspects of the AV, such as the acceleration, braking, and steering systems.

According to examples described herein, an integrated clutch steering system is provided for retrofitted or commercially-built AVs. The integrated clutch steering system can be installed on the steering column of an AV using an offset gear and can include an AV motor/clutch assembly to apply torque to the steering column to steer the AV based on steering commands from the AV control system. The offset gear can include a first gear endpoint and a second gear endpoint, and can be coupled to the steering column at the first gear endpoint. The second gear endpoint can be coupled to the steering clutch and controlled by the AV steering motor while the steering clutch is engaged to apply torque to the steering column to steer the AV.

In various implementations, the integrated clutch steering system can be provided as a mechanical clutch without external controls, and can be preset to a predetermined torque. As a mechanical system, torque applied above the predetermined torque limit can cause the integrated clutch steering system to slip but not release. Thus, a maximum transferrable torque on the steering system can be established by the integrated clutch steering system. As such, in the event of a manual override, the integrated clutch can be caused to slip, thereby causing the AV control system to release control of the steering system more quickly. Furthermore, the integrated steering clutch can reduce a maximum torque that the motor can produce on the steering system in case of a fault condition.

In some aspects, the steering clutch can be overridden when a predetermined amount of torque is applied to the steering column (e.g., by a user physically turning the steering wheel) to enable manual steering of the AV. For example, the AV steering motor may be configured to apply a maximum of ~12-15 Nm of torque to the steering column. Along these lines, a typical adult human being can readily apply over 20 Nm of (leveraged) torque to the steering column using a typical steering wheel. Accordingly, the steering clutch can be a torque limited clutch that slips or is otherwise overridden when the torque on the steering column exceeds a predetermined threshold (e.g., ~17 Nm).

In variations, the steering clutch can comprise a remotely operated clutch, such as an electromagnetic clutch, that can be overridden by the AV control system when the torque on the steering column is detected to exceed the predetermined threshold. The AV control system can monitor a torque sensor that measures torque on the steering column to determine whether the torque applied to the steering column exceeds the predetermined threshold in order to override the steering clutch. In some examples, the torque sensor can be mounted along the steering column (e.g., at the first gear endpoint of the offset gear).

In many implementations, the AV control system can operate the AV steering motor and the acceleration and braking systems of the AV by utilizing processed sensor data from the plurality of on-board sensors. The AV steering motor can operate a steering mechanism coupled to a distal end of the steering column, where the steering mechanism can engage a pair of front wheels to steer the AV in response to the torque applied to the steering column by the AV steering motor. In some aspects, the steering mechanism can include a steering actuator coupled to the distal end of the steering column. In normal operation, the steering actuator can reactively aid in steering the AV, for example, in accordance with an electronic power steering controller that provides torque input to the steering actuator. Thus, the electronic power steering controller operates the steering actuator in a default mode that enables the steering actuator to reactively aid in steering the AV based on torque provided by the AV steering motor on the steering column.

In certain aspects, the AV control system may detect a failure of the AV steering motor and utilize the steering actuator to proactively steer the AV as a backup system. For example, the AV control system can override the electronic power steering controller to operate the steering actuator in a secondary mode that enables the steering actuator to proactively steer the AV. Thus, in the secondary mode, the AV control system can transmit control commands to the steering actuator to control steering of the AV.

According to examples described herein, the integrated clutch steering system can be included as a package comprising the offset gear, the AV steering motor, and the steering clutch for installation on the steering column of a non-automated vehicle. Additionally, the integrated clutch steering system can include the AV control system to couple to the AV steering motor in order to steer the retrofitted AV. Accordingly, the integrated clutch steering system can be coupled to vehicles having hydraulic, hydraulic-electronic, full electronic, variable assist, and/or variable gear ratio power steering mechanisms.

Among other benefits, the examples described herein achieve a technical effect of providing a safety feature for AVs to enable a user to readily override the steering system using a motor/clutch assembly mounted to the steering column via an offset gear, and further providing a dual mode steering mechanism that enables the AV control system to continue steering in the event of a primary failure of the integrated clutch steering system.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
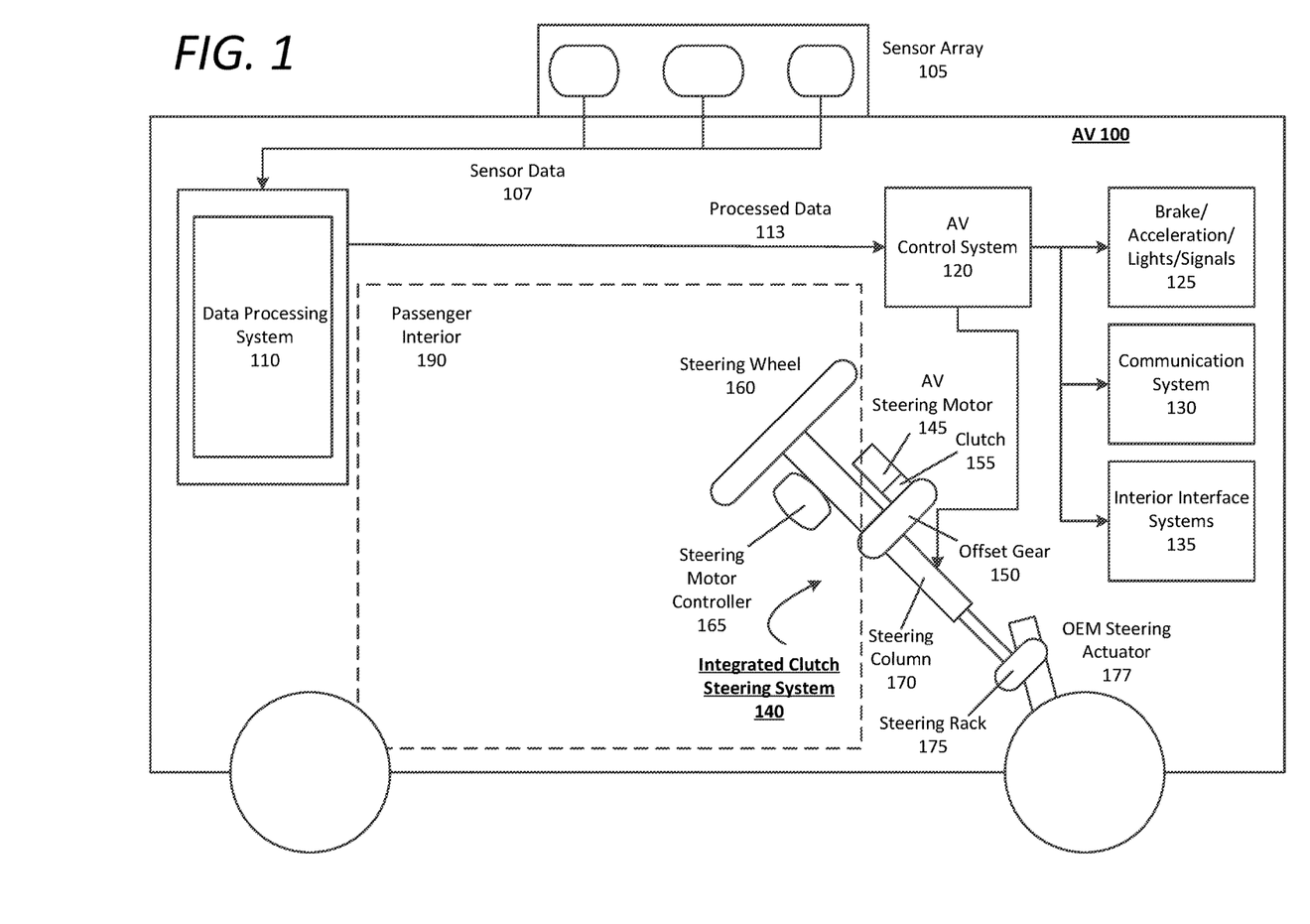
FIG. 1 is a block diagram illustrating an example integrated clutch steering system in connection with an AV, as described herein.

FIG. 1 is a block diagram illustrating an example integrated clutch steering system 140 in connection with an AV 100, as described herein. The AV 100 can include a sensor array 105 to detect the AV's 100 driving environment in real time. The sensor array 105 can include any number of stereo cameras, radars, LiDARS, motion sensors, proximity sensors, and the like. In order to operate smoothly, efficiently, reliably, and safely, the AV 100 may require constant processing of sensor data 107 from the sensor array 105. Accordingly, the AV 100 can include a powerful data processing system 110 comprising any number of CPUs and/or FPGAs. The data processing system 110 can continuously process the sensor data 107 and provide the processed data 113 to an AV control system 120, which can control the various operational components of the AV 100.

In many aspects, the AV control system 120 can utilize the processed data 113 to control the steering, braking, acceleration, lights, and signaling systems 125 (e.g., the drive-by-wire system) of the AV 100. Furthermore, the AV control system 120 can control the communications system 130 of the AV 100 when, for example, the AV 100 needs to communicate with other AVs, a central network system(s) or a backend server system, or a mapping resource. The AV control system 120 can further control an interior interface system 135 to present data (e.g., travel data) to passengers and/or provide network services (e.g., Internet service) to the passengers. As a part of the acceleration and braking system 125, the AV 100 can include an integrated clutch steering system 140, which can also be operated by the AV control system 120 to steer the AV 100.

According to examples described herein, the integrated clutch steering system 140 can include an AV steering motor 145 operable by the AV control system 120 to apply torque to the steering column 170 of the AV 100. The AV steering motor 145 can be coupled to a steering clutch 155 which itself can be coupled to an offset gear 150. The offset gear 150 can couple the AV steering motor 145/steering clutch 155 assembly to the steering column 170, and can operate to transfer torque from a motor shaft of the AV steering motor 145 to the steering column 170. A detailed description of the offset gear 150 mechanism is provided herein in connection with FIG. 2B.

Referring to FIG. 1, the steering mechanism of the AV 100 can include a steering wheel 160 coupled to the steering column 170, and a steering motor controller 165 (e.g., an electronic power steering unit) that can aid a driver in steering the AV 100 under manual control—like in modern road vehicles. The steering motor controller 165 can control a steering rack 175 (which may be provided with an original equipment manufacturer (OEM) actuator 177), which can provide additional torque to reactively aid in steering the AV 100 in manual and automated control.

In many aspects, the AV control system 120 can utilize the processed data 113 to operate the AV 100 in normal road and traffic conditions, which can include operating the AV steering motor 145 to physically turn the steering column 170 in order to steer the AV 100. Operation of the AV steering motor 145 can provide torque to a second gear endpoint of the offset gear 150, which can transfer the torque to a first gear end point of the offset gear 150 that is coupled to the steering column 170. Accordingly, the AV control system 120 can operate the steering system of the AV 100 by controlling the AV steering motor 145 to physically turn the steering column 170.

In accordance with examples described herein, a user of the AV 100 can override the integrated clutch steering system 140 by manually taking control of the steering wheel 160. In mechanical aspects, the AV steering motor 145 can be coupled to the second gear endpoint of the offset gear 150 via a steering clutch 155, which can mechanically override the AV steering motor 145 from the offset gear 150 when the user takes manual control of the steering wheel 160. For example, the steering clutch 155 can be structured to be automatically overridden when a predetermined amount of torque is applied to the steering column 170 by the user operating the steering wheel 160. Rotational force exerted using the steering wheel 160 can be transferred to the clutch 155 via the offset gear 150, which, if a preconfigured clutch threshold is exceeded (e.g., the clutch slip point), overriding the steering clutch 155—thereby enabling manual control of the AV 100. In many aspects, the when the steering clutch 155 is overridden manually by the user, slightly more force may be required for manual operation of the steering wheel 160 in order to maintain an override state of the steering clutch 155.

In some implementations, when the steering clutch 155 is overridden by manual takeover—which can be detected or triggered by the AV control system 120—the AV control system 120 can provide an alert via the interior interface systems 135. Additionally or alternatively, the AV control system 120 can disengage the acceleration system of the AV 100, and enable manual pedal control automatically. In some examples, manual pedal control can involve an initial state in which the accelerator pedal is handed off to the user for manual operation, and a secondary state in which the brake pedal is handed off to the user for manual operation. Specifically, when the steering clutch 155 is overridden, the AV control system 120 can immediately perform a handoff of the accelerator pedal, but can place the brake pedal in a standby mode for handoff when the user performs a specified function (e.g., engaging the brake pedal, or providing an input on a display feature).

In certain examples, disengaging the steering clutch 155 can mechanically cause the offset gear 150 to be placed in neutral, thereby allowing the steering wheel 160 to turn freely and operate the steering rack 175 directly in order to manually steer the AV 100. As described herein, manual steering control (as well as automated steering control) can be aided by the steering motor controller 165, which can detect rotational input on the steering wheel 160 (e.g., via a number of steering sensors) and control the steering rack 175 to apply reactive conjunctional torque to the steering column 170 and/or a linear actuator of the steering system (e.g., a rack and pinion mechanism). As further described herein, the steering motor controller 165 can be part of an electronic, a hydraulic, or an electro-hydraulic power steering system. Accordingly, the steering rack 175 can comprise a hydraulically operated actuator or an electric motor operable on one or more of the steering column 170 or the linear actuator that directly turns the front wheels of the AV 100.

As provided herein, the steering clutch 155 may be mechanically overridden by a user when a predetermined amount of torque is exceeded, and/or electronically overridden by the AV control system 120 when the predetermined amount of torque is exceeded. In the latter example, the AV control system 120 can be connected to control the AV steering motor 145, the steering clutch 155, the steering motor controller 165, the steering rack 175, and/or the offset gear 150 as discussed below with respect to FIG. 2A.

Figure 2A:
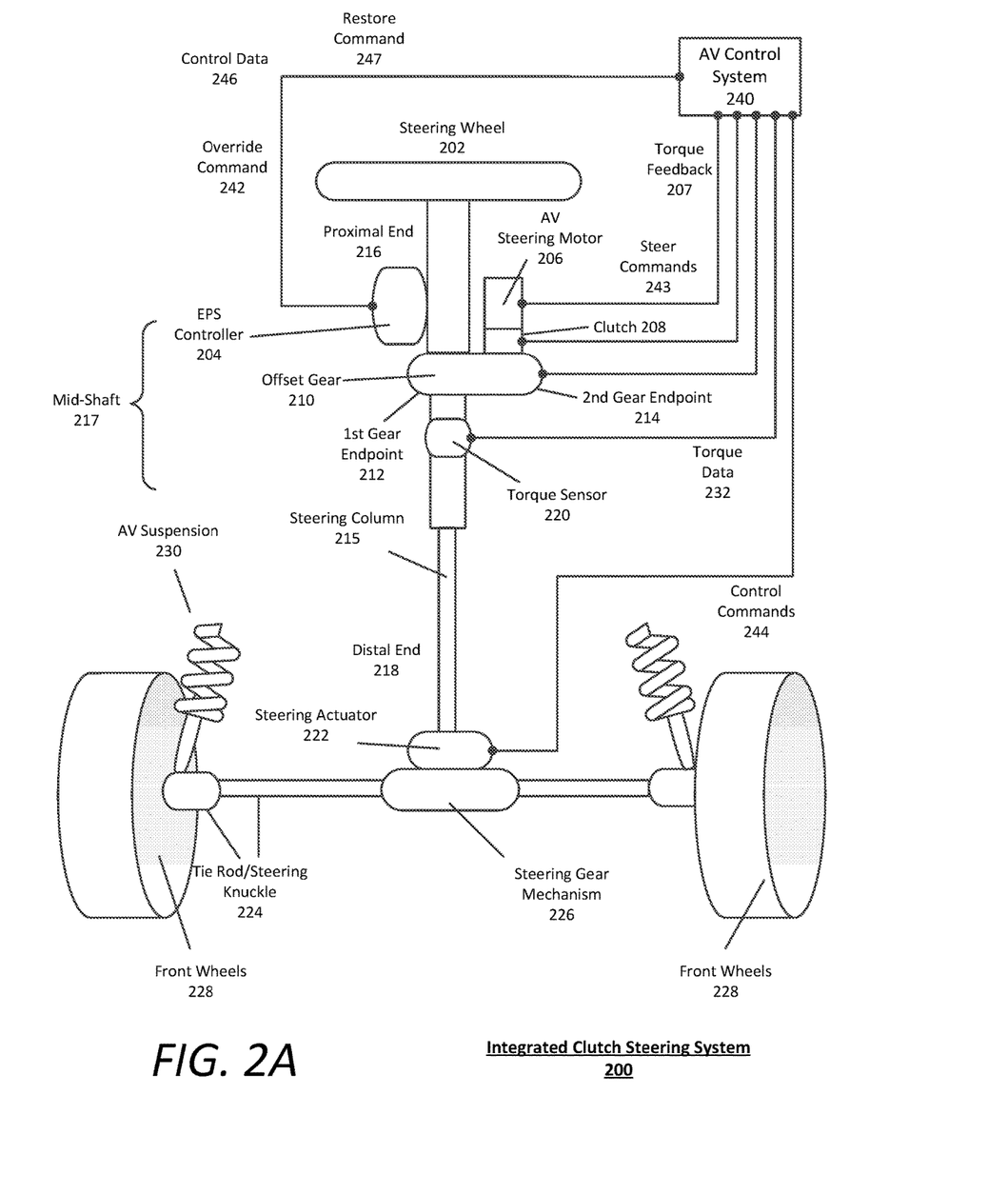
FIG. 2A is a schematic diagram showing an example integrated clutch steering system coupled to an AV control system.

FIG. 2A is a schematic diagram showing an example integrated clutch steering system 200 coupled to an AV control system 240. The AV control system 240 can be coupled to various control components of the AV 100 in conjunction with the steering system, such as the acceleration and braking system. For example, the AV control system 240 can be connected to the AV steering motor 206 to apply torque to the steering column 215 in order to steer the AV 100. In operation, the AV control system 240 can transmit steer commands 243 to the AV steering motor 206 which can be coupled to the offset gear 210 at a second gear endpoint 214 via the steering clutch 208. The AV steering motor 206 can include a drive shaft that drives the offset gear 210, which transfers torque to the steering column 215 at the first gear endpoint 212.

Additionally, while the AV control system 240 operates the AV steering motor 206, a human user can take manual control of the steering wheel 202 in order to automatically override the AV steering motor 206. As an example, when the user exerts force on the steering wheel 202 that opposes the steer commands 243 executed by the AV steering motor 206, torque feedback 207 can be provided to the AV control system 240 directly via the AV steering motor 206, or via a torque sensor 220, which can cause the AV control system 240 to perform a number of backup functions (e.g., provide an alert or query to the user for manual handoff).

In some examples, the AV control system 240 can monitor torque data 232 on the steering column from the torque sensor 220 to determine whether a predetermined amount of torque has been exceeded. For example, the AV steering motor 206 can be configured to provide a maximum torque on the steering column 215 (e.g., ~12-15 Nm of torque). When the torque data 232 indicates that the maximum torque has been exceeded by a certain amount (e.g., ~3 Nm), then the AV control system 240 can determine that the steering clutch 208 has been manually overridden. In some examples, the torque sensor 220 can be mounted at the distal end 218 of the steering column 215. In variations, the torque sensor 220 can be included in the offset gear 210 (e.g., the first gear endpoint 212 of the offset gear 210).

To restore automatic steering, the AV control system 240 can reengage the steering clutch 208. For example, during manual operation, the driver can provide input (e.g., on a touch-sensitive display screen displaying a control interface) to restore automated control of the AV 100. In response to the user input (e.g., a touch input on a selectable display feature on the control interface), the AV control system 240 can reengage the steering clutch 208 and provide steer commands 240 to the AV steering motor 206 in order to automatically steer the AV 100.

The integrated clutch steering system 200 can be coupled to the steering column 215 at a mid-shaft 217 of the steering column 215—where the steering wheel 202 can be coupled at a proximal end 216, and the steering actuator 222 can be coupled at a distal end 218. In certain implementations, the AV 100 can include an electronic power steering (EPS) controller 204 that monitors input on the steering column 215 (e.g., via the torque sensor 220) and reactively aids in steering the AV 100 (e.g., providing assistive torque on the steering column 215) by controlling the steering actuator 222. The steering actuator 222 can comprise an electric motor that can apply additional torque to the steering column 215 and/or the steering gear mechanism 226 (e.g., a linear actuator) to reactively aid in steering the AV 100. Accordingly, the amount of torque applied to the steering column 215 by the AV steering motor 206 can work conjunctively with the EPS controller 204 to steer the AV 100.

The steering gear mechanism 226 can comprise a rack and pinion mechanism, or other type of steering box, to provide mechanical force (i.e., tensile and compressive force) via the AV's 100 tie rods and steering knuckles 224 to turn the front wheels 228 of the AV 100. During normal operation, the steering actuator 222 behaves reactively under control of the EPS controller 204 to provide additional force on the steering gear mechanism 226 based on the torque applied by either the AV steering motor 206 (under automated control) or the steering wheel 202 (under manual control).

Under manual operation, the AV control system 240 can maintain situational and environmental awareness of the AV 100. With the steering clutch 208 overridden, however, the AV control system 240 is unable to utilize the AV steering motor 206 to prevent a potential accident or emergency situation while the AV 100 is under manual control. In such situations, the AV control system 240 can immediately override manual control of the acceleration and braking systems to prevent potential accidents or catastrophes. Furthermore, when such situations are detected the AV control system 240 can utilize alternative steering components of the integrated clutch steering system 200 in order to retake steering control. For example, the AV control system 240 may lock the steering wheel by triggering the steering lock. Additionally or alternatively, the AV control system 240 may utilized the EPS controller 204 to counteract the steering wheel 202 by controlling the steering actuator 222.

In certain implementations, while in automated control, the AV control system 240 can identify a steering control failure or an error in the AV steering motor 206 in executing the steering commands 243. The steering control failure can be detected by the AV control system 240 in any number of ways. For example, the AV control system 240 can determine that the torque data 232 from the torque sensor 220 does not correlate with the steering commands 243. Other issues with automated steering can include a worn clutch 208 that occasionally slips, issues with the offset gear 210 (e.g., worn gears at either the first gear endpoint 212 or second gear endpoint 214), or a failed linkage between the offset gear 210 and either the steering column 215 at the first gear endpoint 212, or the steering clutch 208 at the second gear endpoint 214.

When a steering control failure is identified, among other operations using other systems of the AV 100 (e.g., transmitting a notification to a central monitoring datacenter), the AV control system 240 can transmit an override command 242 to the EPS controller 204, which can cause the EPS controller 204 to operate in a proactive mode. In the proactive mode, the EPS controller 204 can be utilized to cause the steering actuator 222 to steer the AV 100. Accordingly, when a steering control failure is detected, the AV control system 240 can transmit the override command 242 to the EPS controller 204, and transmit the steering commands 243 as control commands 244 to the steering actuator 222 (e.g., via the EPS controller 204) in order to cause the steering actuator 222 to proactively steer the AV 100.

In current road vehicles, the EPS controller 204 normally operates in a reactive mode by receiving an input via a number of sensors of the vehicle's steering system 200. Such sensors can include a torque sensor 220 that measures torque on the steering column 215, a rotation sensor that can measure the rotation of the steering column 215 as compared to a control position (i.e., ±N° from a zero angle), and/or any number of touch sensors on the steering wheel 202 or other sensors providing data corresponding to components of the steering system 200 (e.g., sensors of the AV suspension 230 and/or steering gear mechanism 226). The EPS controller 204 can receive input from any number of the sensors to dynamically determine a rotational vector identifying a sense of rotation of the steering column 215. Responsive to the sense of rotation (caused by either a driver or the AV steering motor 206 turning the steering wheel 202), the EPS controller 204 controls the steering actuator 222 to provide additive torque to aid the driver or AV steering motor 206 in turning the steering column 215 or the steering gear mechanism 226.

In certain aspects, when a steering control failure is detected by the AV control system 240, the override command 242 can cause the EPS controller 204 to operate the steering actuator 222 in a proactive backup mode. In this mode, the AV control system 240 can actively take control of the steering actuator 222 and thus transmit control commands 244 directly to the steering actuator 222 to steer the AV 100. In other aspects, the AV control system 240 can generate and transmit control data 246 to the EPS controller 204 to cause the EPS controller 204 to proactively steer the AV 100 as if it were still in a reactive mode. For example, in the backup state, the AV control system 240 can construct and provide torque data to the EPS controller 204 to enable the EPS controller 204 to "reactively" cause the steering actuator 222 to steer the AV 100. As such, the AV control system 240 can leverage the EPS controller's 204 control of the steering actuator 222 to proactively steer the AV 100.

While in this proactive or backup mode, the AV control system 240 can continue to monitor torque data 232 from the torque sensor 220 to determine whether the torque applied to the steering column 215 correlates to the control commands 244 transmitted to the steering actuator 222 (either directly or via the EPS controller 204). In the same manner in which the AV steering motor 206 and steering clutch 208 are operated, if a predetermined amount of torque is exceeded on the steering column 215, the AV control system 240 can determine that a user is taking over manual control, and can restore the EPS controller 204 to its reactive mode via a restore command 247. Accordingly, the user's operation of the steering wheel 202 and the reactive torque aid supplied by the EPS controller 204 via the steering actuator 222 can be restored.

Figure 2B:
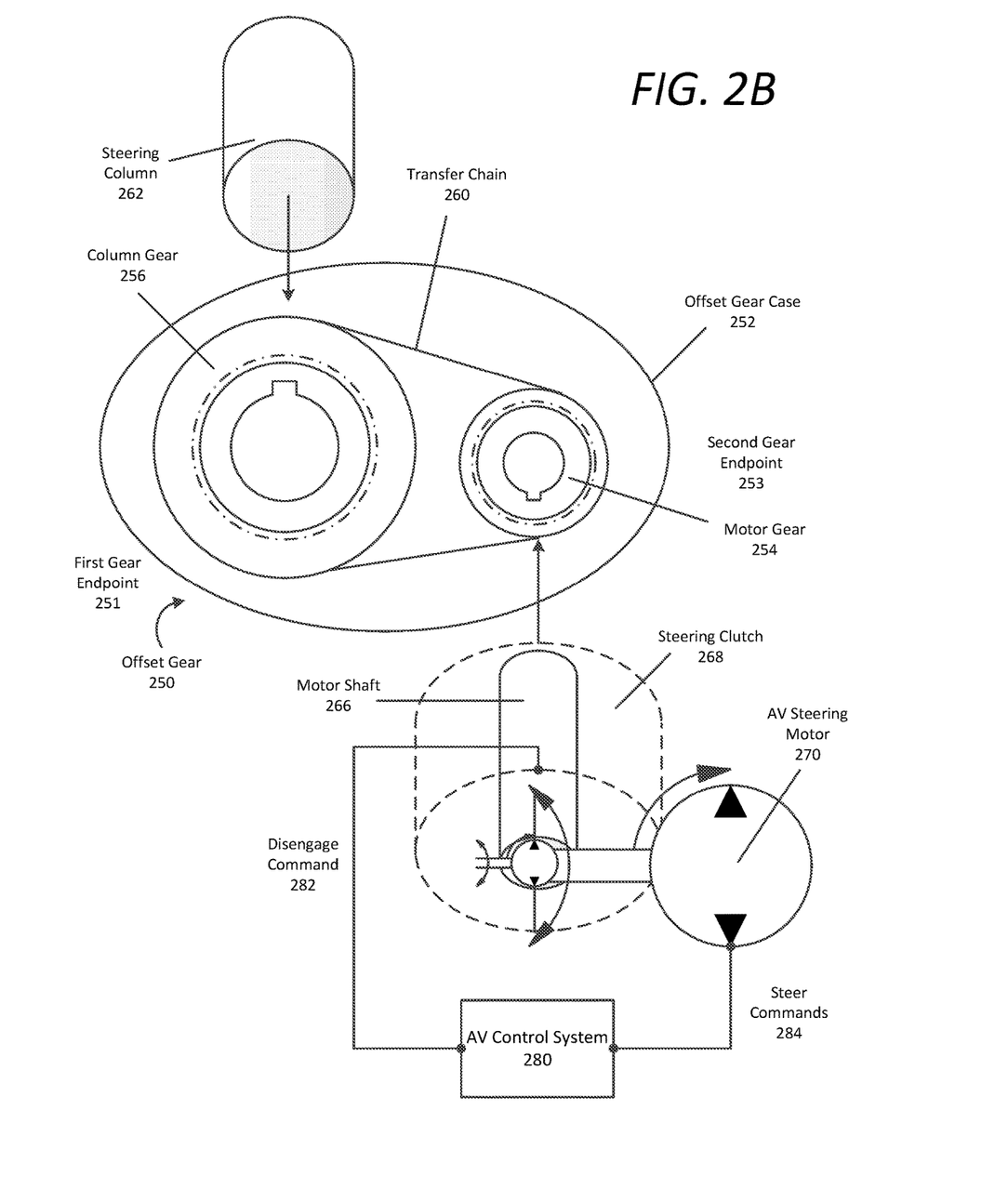
FIG. 2B is a schematic diagram illustrating an example offset gear upon which the integrated clutch steering system can be installed on a steering column.

FIG. 2B is a schematic diagram illustrating an example offset gear upon which the integrated clutch steering system 200 can be installed on a steering column 262. A steering column 262 of a vehicle's steering system can run from the vehicle's steering wheel to the steering box (e.g., the steering gear mechanism 226 shown in FIG. 2A). Depending on implementation, the steering column 262 can be a single shaft, or can include one or more linkages between the steering wheel and the steering box. In many examples, the offset gear 250 can include a first gear endpoint 251, through which the steering column 262 runs, and a second gear endpoint 253, through which a motor shaft 266 of the AV steering motor 270 runs. Thus, torque provided by the AV steering motor 270 is transferred to the steering column 262 by the offset gear 250.

At the first gear endpoint 251, the offset gear 250 can include a column gear 256 which can be secured through the steering column 262. At the second gear endpoint 253, the offset gear 250 can include a motor gear 254, which can be secured through the motor shaft 266. In some aspects, the offset gear 250 can comprise a direct meshing between the motor gear 254 and the column gear 256. In other aspects, the offset gear 250 can include any number of reducer gears or transfer gears and/or a transfer chain 260 (e.g., such as in a transfer case) within an offset gear case 252 to transfer torque between the AV steering motor 270 and the steering column 262.

According to examples described herein, the motor shaft 266 can be coupled to the steering clutch 268, which can slip based on an amount of torque applied by a user. The steering clutch 268 can be mechanically configured to slip when predetermined amount of torque is applied. For example, when applied torque on the steering column 262 via the steering wheel opposes the torque applied by the AV steering motor 270 by a predetermined amount (e.g., ~3-5 Nm), the steering clutch 268 can remain in a "slipped" state while the AV 100 is being manually controlled.

In automated operation, the AV control system 280 transmits steer commands 284 to the AV steering motor 270 which drives the motor shaft 266 to provide variable torque to the steering column 262 via the offset gear 250. Thus, the integrated clutch steering system 200 can steer the AV 100 in normal operation with the steering clutch 268 engaged. Furthermore, when the steering clutch 268 is overridden by the user, the offset gear 250 automatically comes under manual operation by the user via manual control of the steering column 262 via the steering wheel. Automated drive can be restored, for example, by simply releasing the steering wheel by the user, or by selecting an automated drive feature on an AV interface in the passenger interior 190 of the AV 100 (e.g., a user interface generated on a center console display screen).

Methodology

Figure 3:
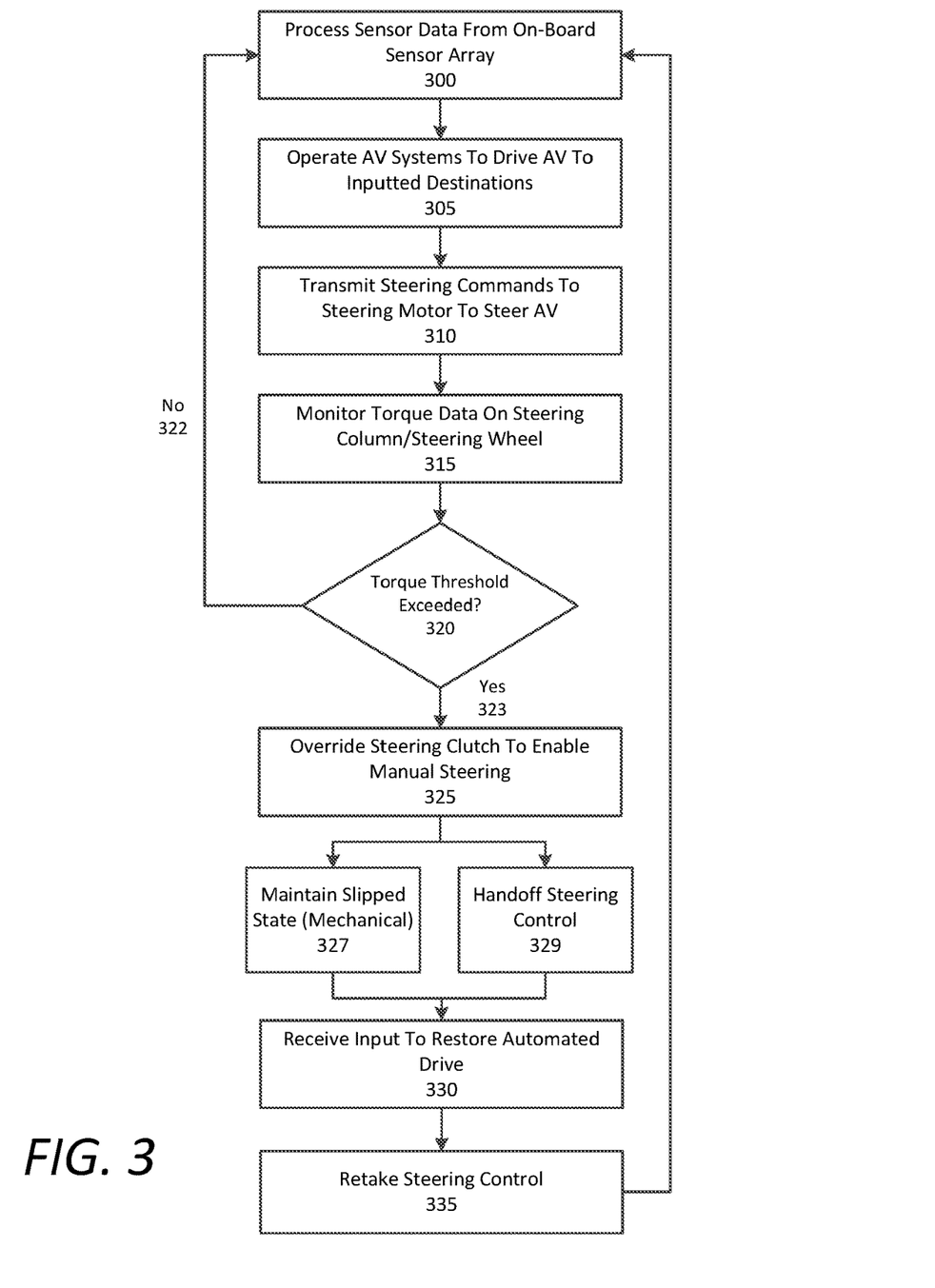
FIG. 3 is a high level flow chart describing an example method of operating an AV steering system.

FIG. 3 is a high level flow chart describing an example method of operating an AV steering system, as described herein. In the below discussion of FIG. 3, reference may be made to like reference characters representing various features of FIG. 1 and FIG. 2A for illustrative purposes. Furthermore, the high level method described in connection with FIG. 3 may be performed by an example AV control system 240, as shown and described in connection with FIG. 2A. Referring to FIG. 3, the AV control system 240 can process sensor data 107 from an on-board sensor array 105 on the AV 100 (300). Furthermore, the AV control system 240 can operate various AV systems to drive the AV 100 to inputted destinations (305). For example, the AV control system 240 can control the communications system 130, the acceleration and braking system 125, and the steering system of the AV 100. Furthermore, the AV control system 240 can receive the inputted destination from, for example, the interior interface system 135 (e.g., via an inputted typed or voice command). In response to the inputted destination, the AV control system 240 can access a mapping resource to travel an optimal route to the destination. Additionally or alternatively, the AV control system 240 can receive the destination via a central network system (e.g., a datacenter) that manages operation of any number of AVs 100 within a given region (e.g., a city). Such AVs 100 may be controlled for the purposes of mail or package delivery, food delivery, automated taxi services, ride facilitation services, and the like.

While operating the AV 100, the AV control system 240 can transmit steering commands 243 to an AV steering motor 206 to steer the AV 100 (310). As described herein, the AV steering motor 206 can be coupled to an offset gear 210 via a steering clutch 208 which, when engaged (by default), can transfer torque from the AV steering motor 206 to the steering column 215 to steer the AV 100. Furthermore, the AV control system 240 can monitor sensor data (e.g., torque data 232 from a torque sensor 220) on the steering column 215 and/or steering wheel 202 (315).

In some aspects, the sensor data (e.g., torque data 232) can be monitored for anomalies that do not correlate to the steering commands 243 generated by the AV control system 240. For example, the AV control system 240 can determine whether the torque data 232 indicates torque on the steering column 215 that opposes the torque applied by the AV steering motor 206. The added torque can comprise a torque spike in the torque data 232, which can indicate that a user has manually opposed the AV steering motor 206 in order to take manual control of the steering system 140. Thus, the AV control system 240 can determine whether the total torque on the steering column 215 exceeds a predetermined threshold (e.g., ~17 Nm) (320). If the detected torque spike does not exceed the predetermined threshold (322), then the AV control system 240 can continue to process sensor data (300) and transmit steering commands 243 to steer the AV 100 (310). However, if the torque spike does exceed the predetermined threshold (323), then the steering clutch 208 can be overridden to enable manual steering of the AV 100 (325). In some aspects, the steering clutch 208 is overridden manually by the user to be maintained in a slipped state as long as the user maintains control of the steering wheel 202 (327). Additionally or alternatively, the AV control system 240 can hand off steering control to the user (329) as well as other AV controls, such as acceleration and braking controls.

In many aspects, user operation of the steering wheel 202 maintains the steering clutch 208 in the slipped state since manual operation of the steering wheel 202 can continuously keep the applied torque above the torque limit of the steering clutch 208. Accordingly, the feel of the steering wheel 202 by the user will be similar or slightly heavier than in a normal road vehicle. As described herein, the user may wish to manually take over the AV 100 for any number of reasons (e.g., driving a favored road, to correct or anticipate a maneuver, an emergency, and the like). Furthermore, taking manual control of the steering can cause the AV control system 240 perform a number of responsive operations. These operations can include a step by step manual handoff of AV controls to the user (e.g., handing off steering and the accelerator immediately, and then braking in response to the user tapping the brake pedal).

Once the user is satisfied or otherwise wishes to switch back to automated drive, the AV control system 240 can receive an input to restore automated control of the AV 100 (330). In many aspects, the handoff input may simply be an action by the user to release control of the steering wheel 202, thereby enabling the steering clutch 208 to retake control of the steering system. As discussed herein, the automated handoff can be triggered by an input on a selectable display feature generated on a user interface of the AV 100 (e.g., generated on a dashboard or center console touchscreen). Additionally or alternatively, the automated handoff can be triggered by a voice command by the driver. In response to the received input to restore automated drive, the AV control system 240 can reengage the steering clutch 208 to provide torque to the steering column 215 via the AV steering motor 206 to steer the AV 100 (335).

Figure 4:
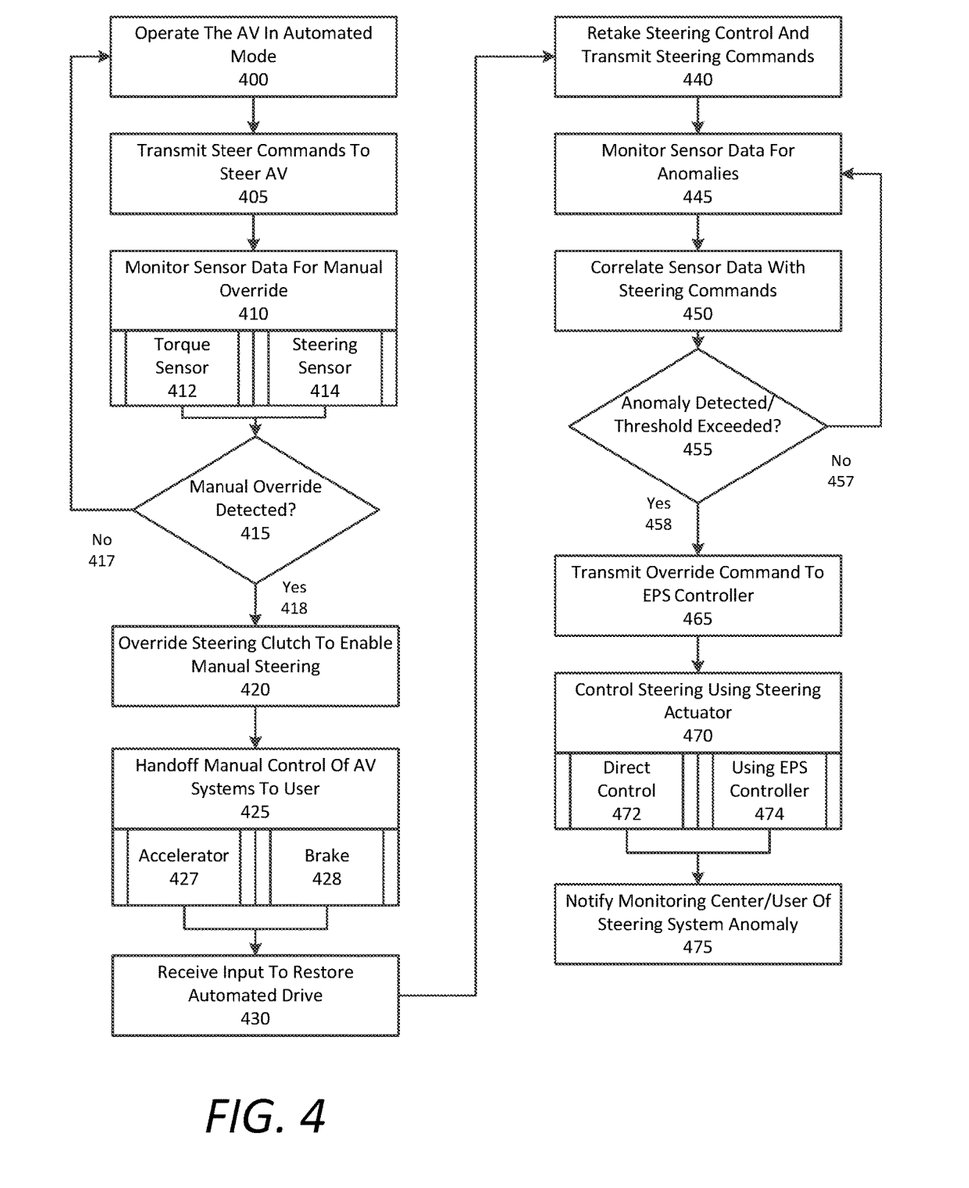
FIG. 4 is a low level flow chart describing an example method of operating an AV steering system.

FIG. 4 is a low level flow chart describing an example method of operating an AV steering system, as described herein. In the below discussion of FIG. 4, reference may be made to like reference characters representing various features of FIG. 1 and FIG. 2A for illustrative purposes. Furthermore, the low level method described in connection with FIG. 4 may be performed by an example AV control system 240, as shown and described in connection with FIG. 2A. Referring to FIG. 4, the AV control system 240 can operate the AV 100 in automated mode (400). In many examples, controlling the AV 100 in automated mode comprises utilizing sensor data 113 to control the various systems of the AV 100 to maneuver through traffic to a destination. In examples provided herein, autonomous control of the AV 100 includes transmitting steer commands 243 to an AV steering motor 206 to steer the AV 100 (405).

While operating the AV 100, the AV control system 240 can monitor sensor data for manual override (410). In many aspects, the AV control system 240 can monitor torque data 232 from a torque sensor 220 along the steering column 215 (412). Additionally or alternatively, the AV control system 240 can monitor a steering sensor (e.g., a rotation sensor or touch sensor) that indicates user operation of the steering wheel 202 (414). Accordingly, the AV control system 240 can determine whether the user has overridden automated control (415). For example, the AV control system 240 can determine whether the torque from the torque sensor 220 has exceeded a predetermined threshold. Additionally, the AV control system 240 can further determine (e.g., via touch sensors on the steering wheel 202) whether the user's hands are on the steering wheel 202.

If the torque does not exceed the predetermined threshold, and/or if the user's hands are not on the steering wheel 202 (417), then the AV control system 240 can continue to operate the AV 100 in automated mode (400). However, if a manual override is detected (418), then the AV control system 240 can override the steering clutch 208 to enable manual steering (420). In some examples, the integrated clutch steering system 200 slips when a predetermined amount of torque is added, and the user can engage in manual control as long as the user maintains control of the steering wheel 202, thus maintaining the steering clutch 208 in a slipped state. Additionally, the AV control system 240 can handoff manual control of other AV systems (425). For example, the AV control system 240 can handoff the accelerator pedal (427) and the brake pedal (428) immediately, at the same time, or in a step by step manner. Alternatively, the AV control system 240 can perform a preconfigured function when the user takes manual control of the steering wheel 202. For example, the AV control system 240 can release the accelerator and execute a certain amount of braking on the AV 100. As another example, the AV control system 240 can simply restore automated control after a single corrective maneuver performed by the user on the steering wheel 202.

While the AV 100 is under manual control, the AV control system 240 can receive an input to restore automated driving (430). As described herein, the input can be on a selectable feature (e.g., an icon on a touch-sensitive display screen, or an analog button on the steering wheel 202). In response to receiving the input, the AV control system 240 can retake steering control and transmit steering commands 243 to the AV steering motor 206 to steer the AV 100 (440).

At any given time, the AV control system 240 can monitor sensor data for anomalies, or receive sensor data indicating an anomaly in the steering system 200 (445). For example, the AV control system 240 can correlate sensor data with the steering commands 243 to determine whether the steering system 200 is responding properly (450). The sensor data can include stereo camera data and/or torque sensor data 232 indicating that the AV 100 is not turning properly. In certain circumstances, the steering anomaly may be systemic, like a steering actuator 222 failure, severe misalignment of the front wheels 228, mechanical issues with the tie rods/steering knuckles 224 or ball joints, or potentially a worn out steering gear mechanism 226 (e.g., worn rack and pinion). In such circumstances—which can be detected by sensors in the steering system—the AV 100 would require servicing, and an alert may be provided that the AV's 100 steering system necessitates immediate repair.

In other circumstances, the steering anomaly may be resolved by bypassing the integrated clutch steering system 200 and utilizing the EPS controller 204 to ultimately steer the AV 100. Such an anomaly may be caused by a worn steering clutch 208, a failure in the steering motor 206, one or more of a worn gear, belt, or chain in the offset gear 210, a worn or failed linkage at the first gear endpoint 212 or the second gear endpoint 214, etc. In these circumstances, the AV control system 240 may be able to bypass the primary steering system (e.g., the AV steering motor 206) and utilize the EPS controller 204 and steering actuator 222 to steer the AV 100.

Thus, the AV control system 240 can determine whether a steering anomaly is indicated in the sensor data (455). In certain aspects, the AV control system 240 can correlate the actual steering of the AV 100 with the steering commands 243 being executed by the AV steering motor 206, and determine whether the actual steering of the AV 100 is within acceptable steering parameters. If not (457), then the AV control system 240 can continue to monitor sensor data for anomalies (445). However, if a detected steering anomaly is outside acceptable parameters (e.g., an unacceptable steering radius correlation, a detected vibration or grinding in the steering system or steering clutch 208, an overheating AV steering motor 206, etc.) (458).

As an intermediate step in some aspects, when an anomaly is detected (458), the AV control system 240 can initially identify whether the source of the anomaly is capable of being bypassed using the EPS controller 204. For example, the AV control system 240 can determine whether the source of the anomaly is the AV steering motor 206, the steering clutch 208, or the offset gear 210. If so, the AV control system 240 can initial the backup steering mode by transmitting an override command to the EPS controller 204 to cause the EPS controller 204 to proactively steer the AV 100 using the steering actuator 222.

As discussed herein, the steering actuator 222 for power steering systems can operate in a normal mode in which the EPS controller 204 operates the steering actuator to reactively aid in rotating the steering column 215 itself, and/or actuating the steering gear mechanism 226 to turn the front wheels 228. In certain examples described herein, when the steering anomaly is detected, the AV control system 240 can transmit an override command 242 to the EPS controller 204 to enable the steering actuator 222 to proactively steer the AV 100 (465). Accordingly, the AV control system 240 may then control steering of the AV 100 using the steering actuator 222 (470). This may be performed either directly, by bypassing the EPS controller 204 and transmitting control commands 244 directly to the steering actuator 222 (472), or by using the EPS controller 204 to control the steering actuator 222 (e.g., to reduce additional control modules and wiring in the AV 100).

The AV control system 240 can utilize the EPS controller 204 in any number of ways. Typically, the EPS controller 204 utilizes sensor data to determine a rotational vector of the steering wheel 202 or steering column 215 to provide conjunctive torque and therefore ease the steering strain on the driver. In certain examples, when the AV control system 240 overrides the EPS controller 204, the AV control system 240 can cause the EPS controller 204 to steer the AV 100 by causing the EPS controller 204 to cease providing reactive assistance. The AV control system 240 may then provide control commands 244 to the steering actuator 222 via the EPS controller 204 to steer the AV 100.

In some aspects, the AV control system 240 can utilize the on-board communication system 130 to notify a monitoring center and/or the passenger(s) of the AV 100 that the backup steering system is being used (475). Utilizing sensor data from any number of components of the integrated clutch steering system 200, the AV control system 240 can identify the source of the anomaly and provide information to the user or the monitoring center (e.g., a central network system) to service the AV 100. For example, if the user owns the AV 100, the AV control system 240 can generate, on an interior display, an alert indicating that the steering system requires servicing. In certain examples, the AV control system 240 can display information indicating the source of the anomaly (e.g., a worn steering clutch 208 or AV suspension 230 damage and misaligned front wheels 228). As another example, if the AV 100 is being utilized for commercial or public transportation services, or goods delivery, the AV control system 240 can notify a central datacenter operating the AV 100, cause the AV 100 to carry out a current task (e.g., a passenger drop-off), and decommission the AV 100 by driving it to a certified service center to resolve the anomaly.

Hardware Diagram

Figure 5:
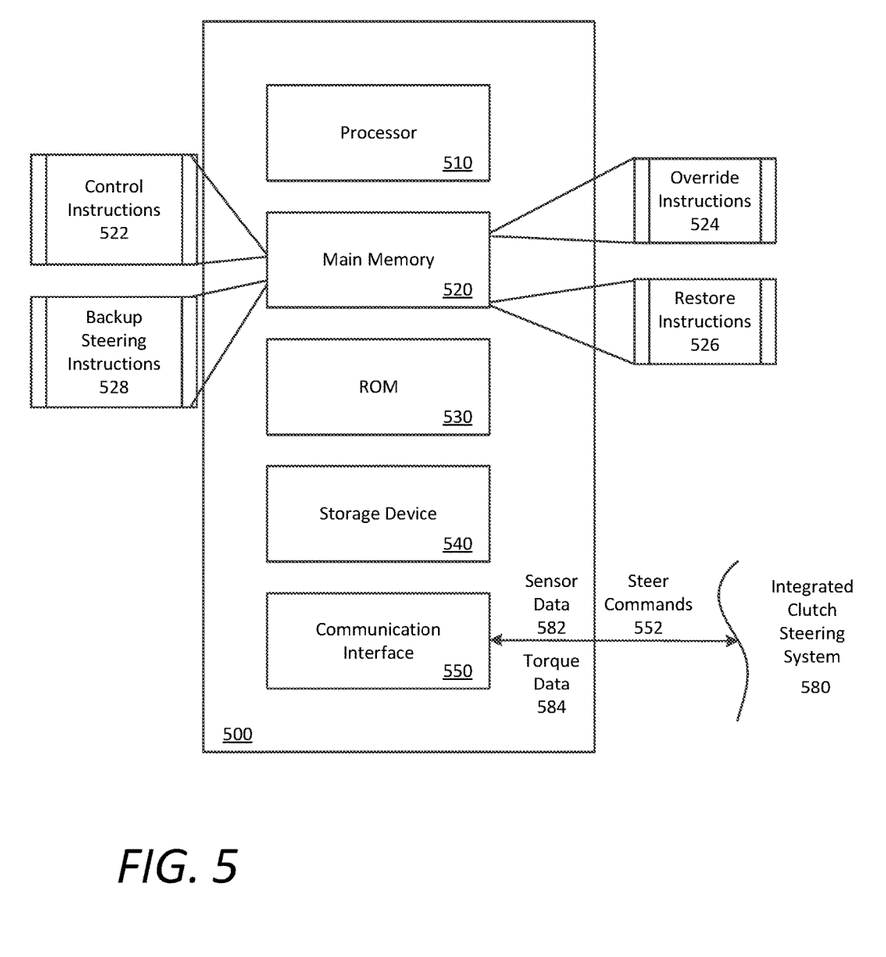
FIG. 5 is a block diagram that illustrates a computer system upon which examples described herein may be implemented.

FIG. 5 is a block diagram that illustrates a computer system 500 upon which examples described herein may be implemented. A computer system 500 can be implemented on, for example, a server or combination of servers. For example, the computer system 500 may be implemented as part of the on-board data processing system 110 or the AV control system 120 of the AV 100 as shown and described with respect to FIG. 1. Furthermore, in the context of FIG. 1, the on-board data processing system 110 and/or the AV control system 120 may be implemented using a computer system 500 such as described by FIG. 5. Additionally, the AV control system 120 can be integrated as a part of the on-board data processing system 110, or may be implemented using a standalone system or a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with the components of the integrated clutch steering system 580 through use of wireless electronic links or a wired interface such as an internal and/or external bus. Using the electronic link, the computer system 500 can communicate with the integrated clutch steering system 680 components, such as the AV steering motor 145, the steering clutch 155, or the steering motor controller 165, as shown and described in connection with FIG. 1. In accordance with examples, the computer system 500 receives sensor data 582 via a set of sensors of the AV 100. The executable instructions stored in the memory 530 can include control instructions 522, which the processor 510 executes to accelerate, brake, and maneuver the AV 100, which includes steering the AV 100. Accordingly, the control instructions 522 cause the processor 510 to process the sensor data 582 and transmit steer commands 552 to the integrated clutch steering system 580 in order to steer the AV 100.

The executable instructions stored in the memory 520 can also include override instructions 524, which enable the computer system 500 to process torque data 584 received from the steering system 140 to determine whether a user is applying torque to the steering wheel 160 to manually override automated driving. For example, if the torque data 584 indicates a manual override, the override instructions 524 can cause the processor 510 to handoff various controls of the AV to the user (e.g., acceleration and braking as well as steering).

Further, the executable instructions stored in the memory 520 can also include restore instructions 526, which the processor 510 can execute to restore automated control of the AV 100 in response to receiving an input from the user. Still further, the main memory 520 can store backup steering instructions 528, which the processor 510 can execute to control the backup steering mechanism (e.g., the steering rack 175) in the event of an anomaly in the primary steering mechanism (i.e., the AV steering motor 145). By way of example, the instructions and data stored in the memory 520 can be executed by the processor 510 to implement an example AV control system 120 of FIG. 1. In performing the operations, the processor 510 can receive sensor data 582 and torque data 584, and, in response generate and transmit steer commands 552 to components of the integrated clutch steering system 580.

The processor 510 is configured with software and/or other logic to perform one or more processes, steps and other functions described with implementations, such as described in connection with FIGS. 1-4, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An integrated clutch steering mechanism for an autonomous vehicle (AV) comprising:
   a steering clutch coupled to a steering column of the AV, the steering clutch being engaged to enable autonomous steering of the AV;
   an offset gear coupling the steering clutch to the steering column; and
   an AV steering motor coupled to the steering clutch, the AV steering motor to apply torque to the steering column via the engaged steering clutch to control steering of the AV;
   wherein when a predetermined amount of torque is exceeded on the steering column, the steering clutch enables manual steering of the AV.

2. The integrated clutch steering mechanism of claim 1, wherein a steering wheel is coupled to a proximal end of the steering column, and wherein a steering actuator is coupled to a distal end of the steering column, the steering actuator to engage a pair of wheels to steer the AV in response to the torque applied to the steering column by the AV steering motor.

3. The integrated clutch steering mechanism of claim 2, wherein the integrated clutch steering mechanism is coupled to a mid-shaft of the steering column, the mid-shaft being between the steering wheel and the steering actuator.

4. The integrated clutch steering mechanism of claim 1, further comprising:
   a torque sensor that measures torque on the steering column.

5. The integrated clutch steering mechanism of claim 4, further comprising:
   an AV control system to:
   autonomously control steering operations of the AV using the AV steering motor;
   monitor the torque sensor; and
   when a measured torque applied to the steering column exceeds the predetermined amount of torque, release the steering clutch to hand over control of the steering operations to a human driver.

6. The integrated clutch steering mechanism of claim 5, wherein the AV control system is further to:
   process sensor data from a plurality of on-board sensors, the sensor data representing a driving environment of the AV; and
   based on the processed sensor data, autonomously operate acceleration and braking systems of the AV;
   wherein the AV control system further autonomously controls the AV steering motor based on the processed sensor data.

7. The integrated clutch steering mechanism of claim 6, wherein the AV control system further hands over manual control of the acceleration and braking systems to the human driver when the measured torque applied to the steering column exceeds the predetermined amount of torque.

8. The integrated clutch steering mechanism of claim 1, wherein the steering clutch continuously engages the AV steering motor to the steering column when torque applied to the steering column is less than the predetermined amount of torque.

9. An autonomous vehicle (AV) comprising:
   an integrated clutch steering mechanism that includes a steering clutch coupled to a steering column of the AV, an offset gear coupling the steering clutch to the steering column, and an AV steering motor coupled to the steering clutch, the steering clutch being engaged to enable autonomous steering of the AV, the AV steering motor to apply torque to the steering column via the engaged steering clutch to control steering of the AV; and
   an AV control system to process sensor data from a plurality of on-board sensors in order to autonomously operate the AV;
   wherein when a predetermined amount of torque is exceeded on the steering column, the steering clutch enables manual steering of the AV.

10. The AV of claim 9, wherein a steering wheel is coupled to a proximal end of the steering column, and wherein a steering actuator is coupled to a distal end of the steering column, the steering actuator to engage a pair of wheels to steer the AV in response to the torque applied to the steering column by the AV steering motor.

11. The AV of claim 10, wherein the integrated clutch steering mechanism is coupled to a mid-shaft of the steering column, the mid-shaft being between the steering wheel and the steering actuator.

12. The AV of claim 9, further comprising a torque sensor that measures torque on the steering column.

13. The AV of claim 12, wherein the AV control system is further to:
   based on the processed sensor data, autonomously control steering operations of the AV using the AV steering motor;
   monitor the torque sensor; and
   when a measured torque applied to the steering column exceeds the predetermined amount of torque, release the steering clutch to hand over control of the steering operations to a human driver.

14. The AV of claim 13, wherein the AV control system is further to:
   based on the processed sensor data, autonomously operate acceleration and braking systems of the AV; and
   when the measured torque applied to the steering column exceeds the predetermined amount of torque, hand over manual control of the acceleration and braking systems to the human driver.

15. The AV of claim 9, wherein the steering clutch continuously engages the AV steering motor to the steering column when torque applied to the steering column is less than the predetermined amount of torque.

* * * * *